United States Patent
Selby et al.

(10) Patent No.: US 7,158,186 B2
(45) Date of Patent: Jan. 2, 2007

(54) METHOD AND SYSTEM FOR CHANGING THE FRAME RATE TO BE OPTIMAL FOR THE MATERIAL BEING DISPLAYED WHILE MAINTAINING A STABLE IMAGE THROUGHOUT

(75) Inventors: Steve Selby, Scarborough (CA); Peter Dean Swartz, San Jose, CA (US)

(73) Assignee: Genesis Microchip Inc., Alviso, CA (US)

( * ) Notice: Subject to any disclaimer, the term of this patent is extended or adjusted under 35 U.S.C. 154(b) by 582 days.

(21) Appl. No.: 10/446,330

(22) Filed: May 27, 2003

(65) Prior Publication Data

US 2004/0239803 A1 Dec. 2, 2004

(51) Int. Cl.
*H04N 7/01* (2006.01)

(52) U.S. Cl. .................. 348/459; 348/441; 348/443

(58) Field of Classification Search ................ 348/359, 348/443, 441, 446, 448, 459; *H04N 7/01*
See application file for complete search history.

(56) References Cited

U.S. PATENT DOCUMENTS

| | | | |
|---|---|---|---|
| 5,485,216 A * | 1/1996 | Lee ............................ 348/443 |
| 6,111,610 A | 8/2000 | Faroudja ..................... 348/441 |
| 6,118,486 A * | 9/2000 | Reitmeier ................... 348/441 |
| 6,147,712 A * | 11/2000 | Shimamoto et al. ........ 348/446 |
| 6,222,589 B1 | 4/2001 | Faroudja et al. ............ 348/448 |
| 6,542,198 B1 * | 4/2003 | Hung et al. ................. 348/459 |
| 6,549,240 B1 * | 4/2003 | Reitmeier ................... 348/459 |
| 6,894,726 B1 * | 5/2005 | Carlsgaard et al. ......... 348/448 |

* cited by examiner

*Primary Examiner*—Trang Tran
(74) *Attorney, Agent, or Firm*—Beyer Weaver & Thomas, LLP

(57) ABSTRACT

A video display system is disclosed. The video display system comprises a display generator for providing a display timing signal and a frame rate converter for receiving input video data, input video timing, and for providing output video data. The system includes a control logic for receiving a frame rate indication signal, the video input timing and the display timing signal. The control logic changes the display frame rate of the display generator in accordance with the native frame rate of the program, and in such a way as to maintain a stable image throughout.

10 Claims, 11 Drawing Sheets

100

| Input Frame Rate | A1 | A2 | A3 | B1 | B2 | C1 |
|---|---|---|---|---|---|---|
| Output Frame Rate1 | Z | A1 | A2 | A3 | B1 | B2 |
| Output Frame Rate2 | Z | A1 | A2 | A3 | B1 | B2 | C1 |

Frame rate change

Fig. 8

| Input Frame Rate | A1 | A2 | A3 | B1 | B2 | C1 |
|---|---|---|---|---|---|---|

| Output Frame Rate1 | Z | A1 | A2 | A3 | B1 | B2 |
|---|---|---|---|---|---|---|

| Output Frame Rate2 | Z | A1 | A2 | A3 | B1 | B1 | B2 | C1 |
|---|---|---|---|---|---|---|---|---|

Frame rate change

Fig. 9

METHOD AND SYSTEM FOR CHANGING THE FRAME RATE TO BE OPTIMAL FOR THE MATERIAL BEING DISPLAYED WHILE MAINTAINING A STABLE IMAGE THROUGHOUT

FIELD OF THE INVENTION

The present invention relates generally to frame rate conversion and more particularly to changing the frame rate of a video display system to be optimal for the material to be displayed.

BACKGROUND OF THE INVENTION

It is common to have material that was originally created at different frame rates for display in a video presentation. Typically, content that have different frame rates are converted to a common frame rate for display. For a description of issues associated with the display of different types of video content and frame rate conversion, refer now to the following.

Display Characteristics

Displays can be broken down into two broad categories, analog and digital. Each display type has its own assets and liabilities.

Analog Displays

Analog displays or CRTs (Cathode Ray Tubes) have two subcategories, progressive and interlaced. Progressive displays, such as computer monitors, display complete frames. They draw each line of the image consecutively. They draw line 1, line 2, line 3 etc. For interlaced displays, such as a conventional television set, the image is divided up into 2 fields. The first field contains the odd lines and is often called the odd field, and the second field contains the even lines which is commonly called the even field. The interlaced display performs a temporal interleaving of the odd and even fields to create the complete video images.

Both display types have similar characteristics. The horizontal display timing must remain constant. Instantaneous changes in the horizontal timing may cause a shifting of the video information due to the relatively narrow bandwidth of the PLL (phased-locked loop) used in the horizontal deflection circuit. The vertical display timing may be able to tolerate some variation since the vertical deflection circuit does not make use of a PLL and may be reset instantaneously. Due to the impulsive nature (low temporal fill factor) of the light output from a CRT, operation at a low frame rate will cause large area flicker to become visible. This appears as a shimmering of the entire image. Therefore, CRTs are typically operated at higher frame rates than some other types of displays.

Digital Displays

Such devices as LCD panels and plasma panels are considered digital displays. These displays are typically pixelated. That is, these display a specific number of pixels per line and lines per frame. Digital displays typically display progressive images. Interlaced images must usually be converted to progressive ones before the images can be displayed. Some typical characteristics of such displays are the following:

Horizontal active video (number of active pixels) must remain constant,

Vertical active video (number of active lines) must remain constant,

The total horizontal timing can vary,

The total vertical timing can vary.

Due to the sample and hold nature (high temporal fill factor) of the light output from some digital displays (in particular LCDs), operation at a low frame rate is often possible without the side effect of large area flicker.

Content Characteristics

There are different types of material content, such as film content and different types of video content.

Film Content

FIG. 1 illustrates film content and displayed images. Film content is traditionally shot and displayed at 24 Hz rate. This means that 24 images are shown every second. Each image contains all of the content at once, much like a photograph. Typically, in movie theaters each film frame is shuttered at 48 Hz or 72 Hz to avoid large area flicker.

Video Content

Video content is displayed in two formats, interlaced and progressive. In an interlaced format each video image or frame consists of two fields, an odd field and an even one. The odd field consists of the odd lines of the image and the even field consists of the even lines of the image. These fields are interleaved temporally and spatially. FIG. 2 illustrates a video frame 10 separated into fields 12 and 14.

The dotted lines in the frame snapshot are the odd sampled lines of the image. The solid lines in the frame snapshot are the even sampled lines of the image. When an interlaced display device draws the image, it draws the odd lines in the first field time slot, and in the second field time slot, it draws the even lines in such a way as to place the even lines in between the odd lines.

For 60 Hz countries like the USA, the video frame rate is 30 Hz. For 50 Hz countries like Germany, the video frame rate is 25 Hz. Typical interlaced video systems that use these frame rates are 480i and 1080i (NTSC), 576i (PAL) and 1080i (PAL).

For progressive images, each image is complete. Each line of the image, odd and even, is drawn sequentially. This is similar to the way a film is displayed, except that it is done in a raster format, that is, it is sampled into lines. Computer displays, for example, typically use this format. In the video domain 480P and 720P operate in this fashion.

Whether an image is interlaced or progressive, both formats share the concept of active video versus total video. FIG. 3 illustrates an entire video frame 11. It is comprised of 2 elements, active video and blanking The white area shown in the middle is the active video 13. It is defined by two parameters, HACTIVE and VACTIVE. HACTIVE defines the number of pixels per line that comprise the displayed image. VACTIVE defines the number of lines that comprise the displayed image. The black area is referred to as the blanking interval 15. Horizontal blanking is defined as the number of pixels per line (HTOTAL) minus the number of active pixels per line (HACTIVE). The vertical blanking interval is defined as the number of lines per field/frame (VTOTAL) minus the active number of lines per field/frame (VACTIVE).

Video Frame Rate Conversion

Frame rate conversion of the video in its simplest terms is the translation from one image rate to another. There are many different types of frame rate conversions ranging from a simple drop/repeat method to a sophisticated motion compensated method. The simple drop and repeat method is commonly used because it is easiest to implement as a system and is most cost effective.

To describe the simple drop and repeat method in more detail, first frame rates must be discussed. There are many types of frame rates for video systems. As mentioned previously 2 common frame rates used in video are 25 Hz (PAL) and 30 Hz (NTSC). Native video material, such as sporting events or news programs, is created by taking a field snapshot every 1/50 sec or 1/60 sec. Each field contains an image of the subject at a unique point in time.

Since film material was originally created at 24 Hz, it must be modified to be used in the video domain. For 60 Hz countries, like the United States, a conversion process known as 3:2 pulldown is used. The first film frame is displayed over 3 video fields and the second film frame is displayed over 2 video fields. Imagine a film sequence of frames ABCD. Each frame is captured 1/24 sec after the last one. When converted into video, the sequence would look like $A_{odd}, A_{even}, A_{odd}, B_{even}, B_{odd}, C_{even}, C_{odd}, C_{even}, D_{odd}, D_{even}$ where the subscript refers to the odd field or the even field and each contains the odd lines or the even lines of the progressive film frame, respectively. This is shown in FIG. 6. For 50 Hz countries, like Germany, 2:2 pulldown is used. In this case each film frame is displayed over 2 video fields. Imagine the same film sequence used above, in a 2:2 pulldown conversion scenario. The video sequence would look like $A_{odd}, A_{even}, B_{odd}, B_{even}, C_{odd}, C_{even}, D_{odd}, D_{even}$.

Referring now to a 3:2 frame rate, different up and down conversions can be created depending upon which frame is dropped or repeated. When up converting by a ratio of 6:5 a 3:2 sequence like AAABB may be converted to AAAABB or AAABBB. When down converting by a ratio of 4:5 the same sequence possible outputs include AAAB and AABB. These two up and down conversions are very different visually. For the symmetric up and down conversion, AAABBB and AABB, the motion judder is decreased compared to the input. Motion judder is the difference between where the eye expects the image to be and where it actually is. In these cases each film image is displayed for exactly the same amount of time. For the asymmetric sequences AAAABB and AAAB the motion judder is increased compared to the input. So care must be taken when doing up and down conversions on asymmetric film material so as to not increase the amount of motion judder. This procedure is more fully described herein below.

Up Conversion

In an up conversion or repeat frame scenario, if the last output frame is finished being displayed before the next input frame is available for reading then the last input frame is drawn again. This is the method of frame rate up conversion. FIG. 4 illustrates frame rate up conversion. Note that frame A is displayed twice. The repeated frame is highlighted by shading. For up conversion, one of the input frames is repeated at the output. In the case of an input sequence conforming to a 3:2 pull down pattern, up conversion can be advantageously performed by repeating the frame which occurs least frequently in the input. Thus the input sequence would be converted from 3:2 to 3:3. Maintaining the symmetry of the output sequence in this way reduces the detrimental appearance of motion judder. For material not conforming to the 3:2 pull down pattern, such as video, up conversion will introduce a periodic motion judder, which is undesirable.

Down Conversion

When the display frame rate is slower than the input frame rate, we need to drop input fields periodically. This is the method of frame rate down conversion. FIG. 5 illustrates frame rate down conversion.

For frame rate down conversion, one of the input frames is dropped from the output sequence. This is done when two input frames are ready for reading before the last output frame is fully displayed. Then only the latest input frame is used and the earlier one is dropped as shown in FIG. 5. It can be seen that input frame D, highlighted by shading, has been dropped from the output frame sequence.

In the case of an input sequence conforming to a 3:2 pull down pattern, down conversion is advantageously performed by dropping the frame, which occurs most frequently in the input. Thus, the input sequence would be converted from 3:2 to 2:2, or even 1:1, for example. This will reduce the amount of motion judder visible to the viewer. Performing down conversion on non 3:2 conforming material such as native video material, will introduce a periodic motion judder, which is undesirable.

Motion Compensation

A more sophisticated approach to frame rate conversion involves motion compensation. In this technique, motion vectors are estimated for each pixel or group of pixels in a frame, indicating how much an image detail may have moved from one frame to the next. This information is then used to temporally interpolate an entirely new frame, which represents the state of the scene at a point somewhere in time between the two nearest input frames. Thus, frames are generated with precisely the correct temporal flow, as opposed to the stuttered motion that is produced when frames are simply dropped or repeated. Although it may offer better performance, this technique is less common in consumer devices due to its relatively high cost.

Film Frame Rate Conversion

Television programs and commercials may frequently contain a mixture of video and film. For example, when a movie is broadcast to TV viewers, commercials or newsbreaks are inserted during the movie presentation. Now we have a mixture of frame rate content. The movie was film originally shot at 24 Hz and converted to video, and the newsbreak is created as native video. If the display device operates at the video frame rate, then the movie will be sub-optimally displayed and motion judder will be apparent while the newsbreak will be displayed shown perfectly. Conversely, if the display device operates at a rate optimal for the movie, then the newsbreak will have motion judder.

Accordingly, when a film section is combined with a video section to provide a video presentation, the film content of the video presentation will include the judder based upon it being presented at the 3:2 frame rate. The problem of judder can also occur when video content of different frame rates are combined. Therefore it is desirable to be able to process combined content, which has different frame rates optimally in a manner that judder is eliminated, or reduced and no artifacts are shown. Heretofore, there have been no systems that provide this optimal delivery of the video presentation when content of different frame rates is put together. The system and method must be cost effective, easily implemented and adaptable to existing video presentation systems.

Accordingly, what is needed is a system and method for displaying a video presentation in an optimal manner when the content with different frame rates is provided together. The present invention addresses such a need.

SUMMARY OF THE INVENTION

A video display system is disclosed. The video display system comprises a display generator for providing a display timing signal and a frame rate converter for receiving the input video data, input video timing, and for providing output video data. The system includes control logic for receiving a frame rate indication signal, the video input timing signals and the video display timing signals. The control logic changes the display frame rate of the display generator in accordance with the native frame rate of the program, and in such a way as to maintain a stable image throughout.

BRIEF DESCRIPTION OF THE DRAWINGS

FIG. 8 illustrates a particular frame rate up conversion scenario.
FIG. 9 illustrates a second frame rate up conversion scenario in which the input is the same as that in FIG. 8.

DETAILED DESCRIPTION

The present invention relates generally to frame rate conversion and more particularly to changing the frame rate of a video display system to be optimal for the material to be displayed. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A method and system in accordance with the present invention displays a sequence of images at a frame rate that is optimal for the material. In a preferred embodiment, material that has an asymmetric film pattern is converted to a symmetric pattern much in the same way a film is presented in a movie theater. Conversely for material where every image is unique such as video, it is displayed at its native rate. For a more detailed description of the features of the present invention, refer now to the following description in conjunction with the accompanying figures.

In short, the frame rate of the display is dynamically changed to allow for optimal reproduction of motion. For film, this means changing the frame rate to allow a symmetric pattern to be displayed from the asymmetric pattern at the source. Typically, for film content there are two patterns that must be handled. The conventional 3:2 where a sequence looks like AAABBCCCDD and a variation 3:2:2:3 pattern which looks like AAABBCCDDD. In either case, the output would be a symmetrical pattern displayed at a frame rate that is an integer multiple for 24 Hz (ie 48 Hz, 72 Hz etc.) For video material the algorithm keeps the display at the native frame rate for the material, typically 50 Hz or 60 Hz as the case may be. Transitions between the frame rates are performed in such a way as to be invisible to the viewer.

Figure 1:
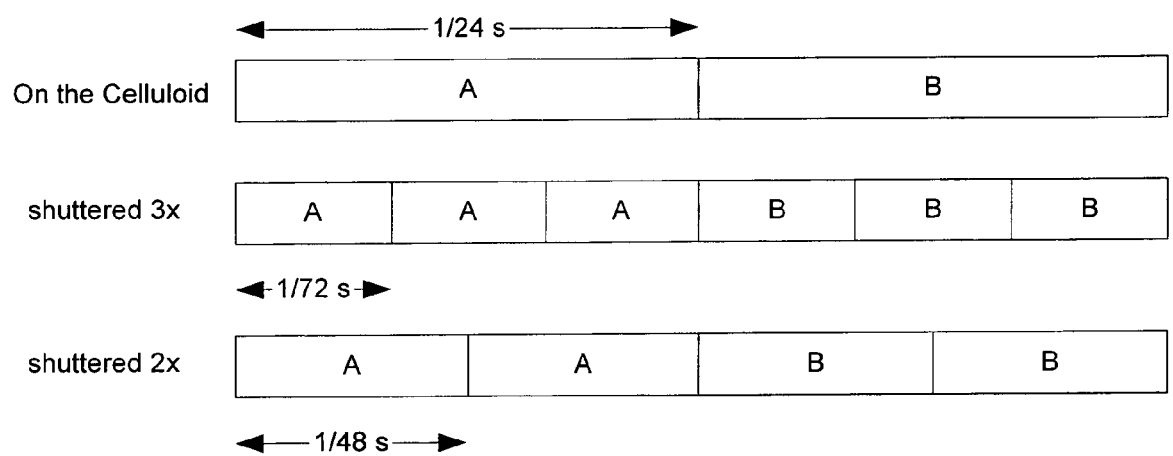
FIG. 1 illustrates film content and displayed images.
Figure 2:
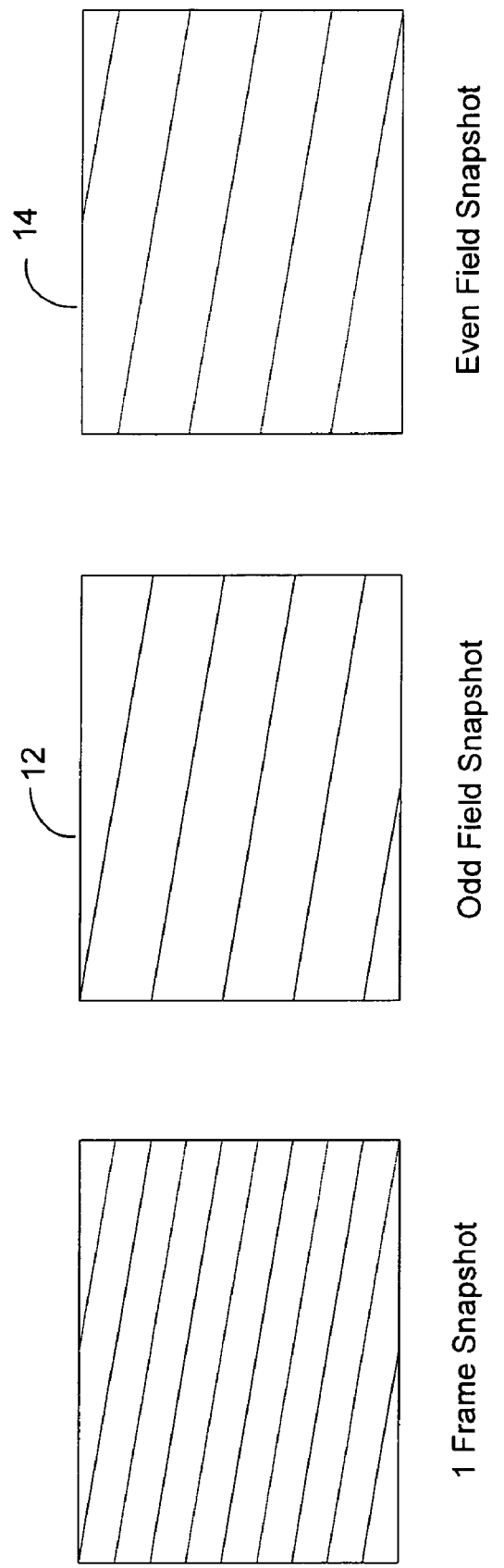
FIG. 2 illustrates a video frame separated into fields.
Figure 3:
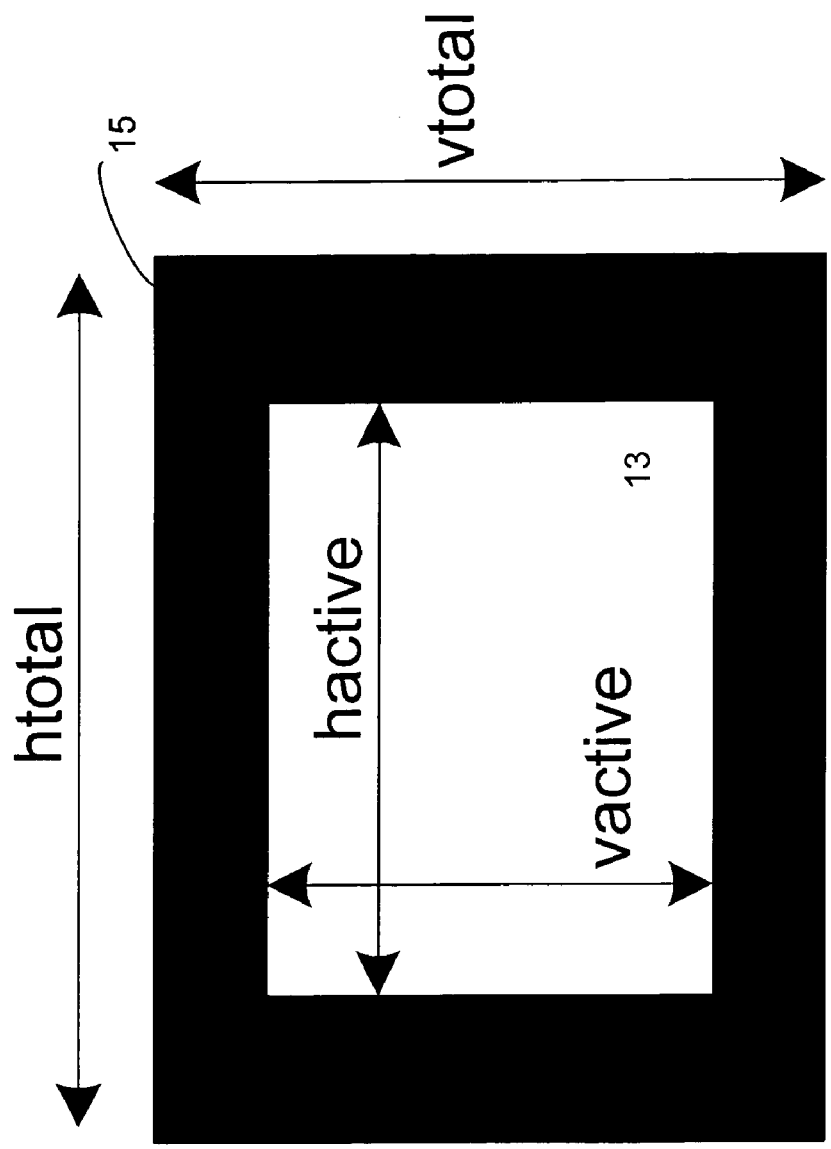
FIG. 3 illustrates an active video window.
Figure 4:
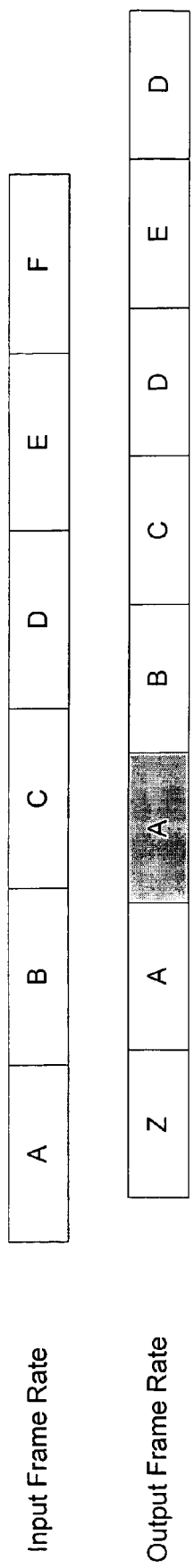
FIG. 4 illustrates frame rate up conversion.
Figure 5:
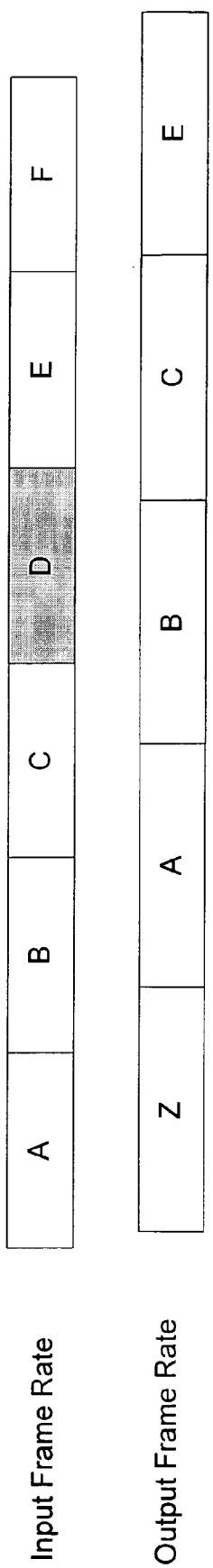
FIG. 5 illustrates frame rate down conversion.
Figure 6:
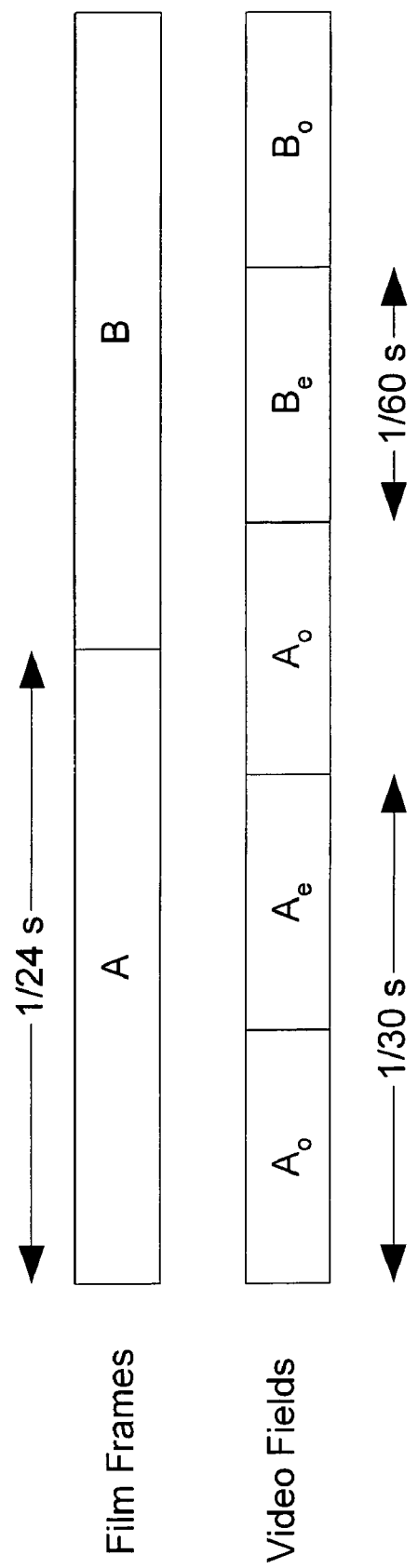
FIG. 6 illustrates 3:2 conversion of film to video.
Figure 7:
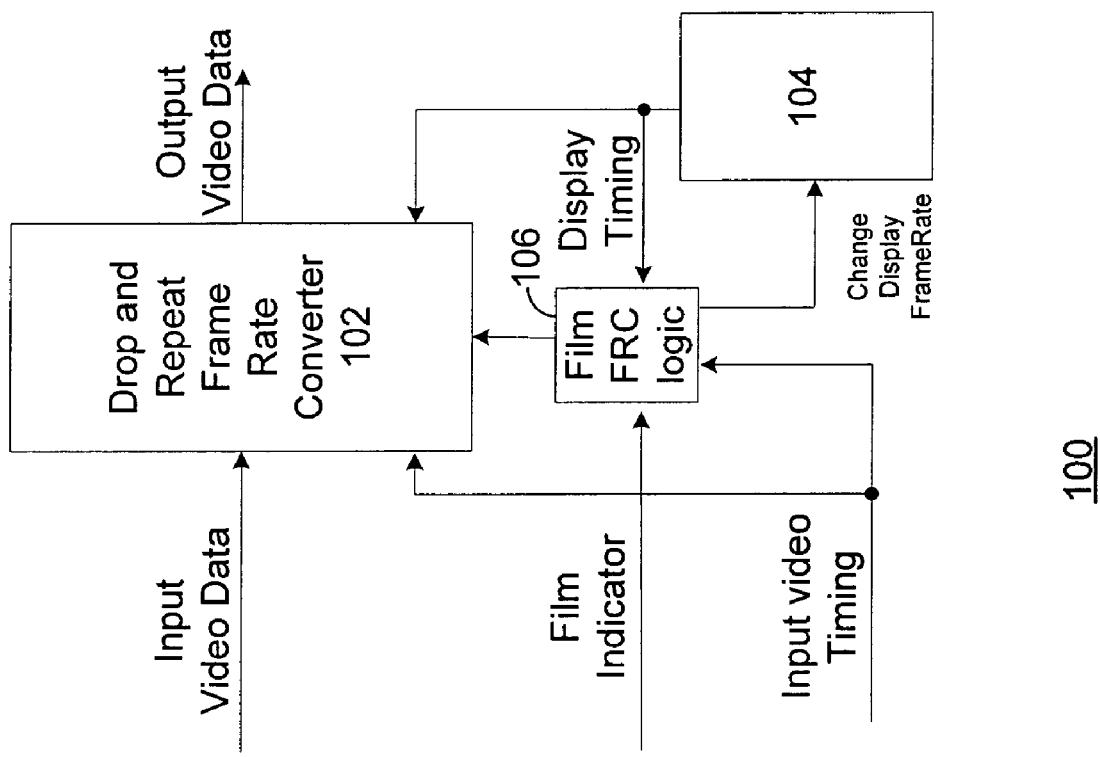
FIG. 7 illustrates a system for seamless frame rate conversion based material content in accordance with the present invention.

FIG. 7 illustrates a system 100 for seamless frame rate conversion of material content. Three elements are included in this system, a drop and repeat frame rate converter (FRC) 102, a display generator 104 and control logic block 106. The various components and their interaction are discussed herein below.

Drop and Repeat Frame Rate Converter (FRC) 102

The purpose of the drop and repeat frame rate converter 102 is to always provide a symmetric output sequence for film material from the asymmetric input frame sequence. For example, going from AAABB to AAABBB or AABB or even AB. The FRC 102 must also switch back to no FRC mode, native rate, when the input is found to be video. This switching must not create any visible picture disruption. The control of the FRC operation comes from the FRC logic block 106.

Display Generator 104

The display generator 104 defines the timing of the output image. It can change the line timing, the number of lines per frame and the number of frames per second. The display generator 106 must be able to switch between two different frame rates in such a fashion as to not cause the video to be corrupted or the display device to lose lock with the image.

To that end, three parameters that can be changed are: the output clock frequency, the total number of pixels per line, or the total number of lines per frame. Which of these parameters or combination of these parameters is changed is dependent upon the characteristics of the display device. Digital display devices such as LCD panels are usually tolerant of instantaneous changes in the time base of the input signal. For such a device, it may be convenient to keep the clock frequency and the total number of lines per frame constant and change the total number of pixels per line in order to achieve the desired frame rate. The number of active pixels in a line would typically remain the same and the total number of pixels per line would be altered by increasing or decreasing the number of pixels during the inactive period (horizontal blanking). This change would be made instantaneously at an opportune time, for example beginning with the first line following the vertical sync pulse.

In order to suit the timing requirements of some display devices, it may be more convenient to keep the clocks per line and lines per frame constant and to change the clock frequency in order to achieve the desired frame rate. In this case, the clock frequency may be changed instantaneously at the boundary between two clock periods, or the clock may be changed relatively slowly over a finite period of time. If the clock is synthesized using a PLL, then a finite time would be required due to the PLL loop bandwidth.

The above techniques may be applied as well in the case of a CRT display device, though some anomalies may occur when the frame rate is switched depending upon the characteristics of the specific CRT deflection system. CRT deflection systems are generally not tolerant to changes in horizontal timing (line timing) due to the characteristics of the horizontal oscillator. They may, however, be tolerant of changes in the vertical timing since the vertical deflection circuit may be reset at any instant. Thus, one way to avoid frame rate switching artifacts on a CRT is to keep the pixel clock frequency and the number of pixels per line constant and then change the total number of lines per frame either by changing the number of active lines or by changing the number of inactive lines. In either case it may be also necessary to make a proportional change in the beam current in order to maintain constant brightness. If the number of active lines is changed, then it will first be necessary to digitally rescale the image in the vertical dimension in order to create the required number of lines. It would further be necessary to adjust the vertical deflection so as to maintain constant vertical size of the image.

Control Logic 106

The control logic 106 has three inputs: a frame rate indication signal, the input video timing, and the display video timing. The logic 106 will ultimately modify the FRC 102 and the display generator 104. The frame rate indication signal is used to define what is the optimal the frame rate of the content and in the case of film to define the input frame sequence. Based on the frame rate indication signal, the input timing and the output timing, the control logic 106 will manipulate the FRC 102 to guarantee that symmetric frame rate conversion occurs. The control logic 106 also defines what the frame rate is for the display generator 104.

Optimizing the Material Based upon the Frame Rate of Content

To provide a symmetric output for a particular asymmetric input, one of three actions can be taken: modify what is written into the FRC memory, modify what is read from the FRC memory, or modify at which frame boundary the frame rate of the display generator is changed. Which of these is modifications is performed is dictated by the control logic 106.

Ultimately, this block determines where the drop or repeat frame is relative to the asymmetric input sequence. It will modify either the FRC write or the FRC read to ensure that the output is symmetric for film. In the case of vide it forces the display generator 104 into a mode such that no frame rate conversion occurs and all of the input information is displayed at the output. For a further description of the operation of the control logic 106, refer now to the following discussion in conjunction with the accompanying figures.

In order to ensure proper conversion of the asymmetric input sequence, such as that used by film which utilizes the 3:2 pulldown ratio, care must be taken with regards to which frames are dropped and which frames are repeated. For a sample sequence like AAABB, when dropping frames we want to drop one of the A frames. This yields an AABB symmetric output sequence. When repeating frames we want to repeat one of the B frames. This yields an AAABBB symmetric output sequence.

Because the frame rates are changing based on the optimal display frame rate for the material, the temporal relationship between the input video and the output video is constantly changing. It is this variability that affects how the frame rate converter will drop or repeat frames. FIG. 8 shows three video streams. The first stream is the input video. The second stream is the output video when the frame rate is the same as the input. You will note that there is a small temporal offset relative to the 2 streams. The output stream is about ¼ frame delayed relative to the input. The third stream is the output video operating at a higher frame rate than the input. In this case the ratio is 6:5. In this case you can see that if simple frame rate conversion occurs that frame A1 is displayed twice. This causes an even more asymmetric output pattern than at the input.

FIG. 9 shows the same input film sequence on the first line as in FIG. 8. The second line shows the output sequence where the frame rate is the same as the input only it is ¾ frame delayed relative to the input. The third stream shows a 6:5 frame rate up conversion. In this case the repeated frame is B1 and a symmetric output sequence is created.

What the control logic block does is examine the timing relationship between the input frame and the output frame, then based on the offset it will determine which field should be repeated or dropped and then it will modify either what is written into the FRC, what is read from the FRC, or when the frame rate of the display actually changes, so as to ensure that the output pattern is symmetric. What follows is one embodiment of the control logic block. In this embodiment the control block modifies when the display generator changes frame rates to ensure the proper operation. The present invention is not intended to be limited to the embodiment shown but is to be accorded the widest scope consistent with the principles and features described herein.

Figure 10:
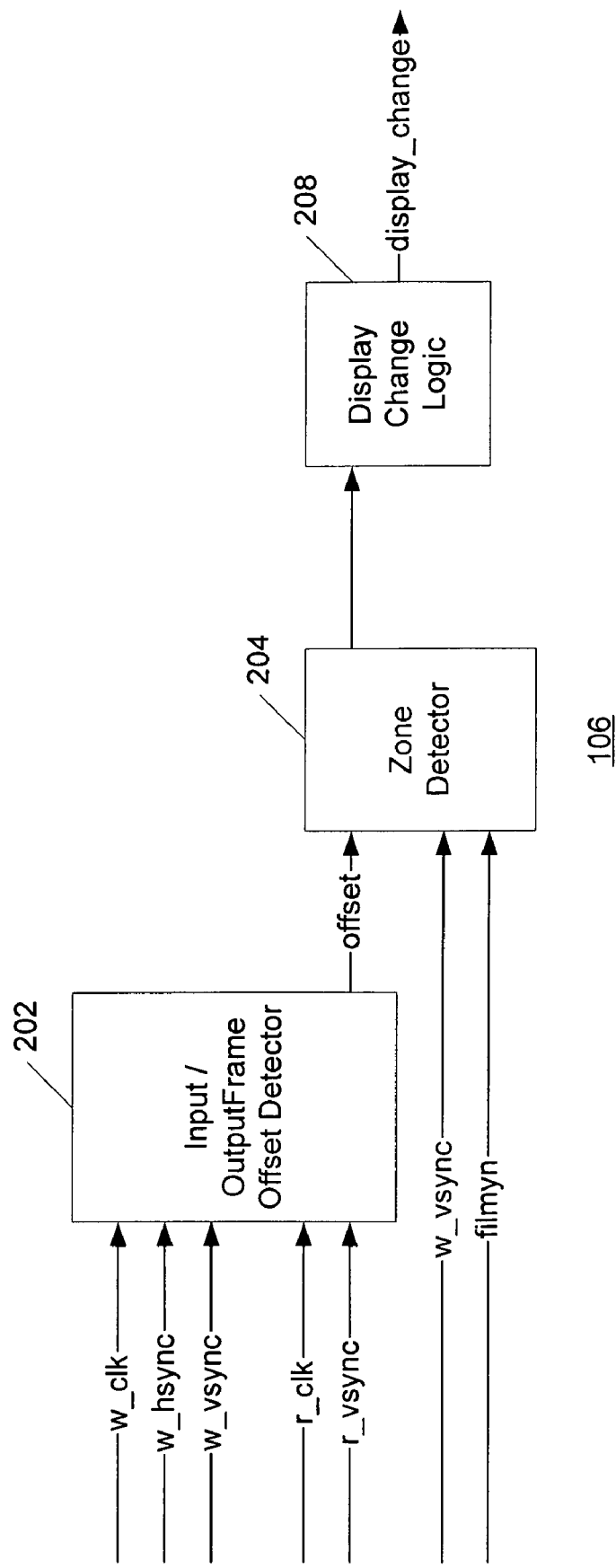
FIG. 10 is a block diagram of control logic.

FIG. 10 is a block diagram of control logic 106. The control logic 106 comprises a relative input output frame offset detector 202, a zone detector 204, and a display change logic 208. Each of the elements is discussed in more detail below.

Input/Output Frame Offset Detector 202

The offset detector 202 measures the input to output frame delay with pixel clock accuracy. At the falling edge of the input vertical timing signal w_vsync, the counter is reset. The counter is incremented in synchronism with an input clock, w_clk.

The output vertical timing signal, r_vsync, is resynchronized to the input clock, w_clk, domain to avoid metastability. At the falling edge of this signal, the pixel accurate counter value is latched. The latched value is passed as an offset into the zone detector 204.

The counter could alternatively be incremented on a line basis as opposed to a pixel basis. When doing this care must be taken to ensure that the input/output timing is never within a line of the change point, otherwise an error could be created. Alternatively, an asynchronous clock or the output clock could be used as opposed to the input clock.

Zone Detector 204

The zone detector 204 examines the relative timing of the input and the display frames. When the frame rate signal goes high, the offset value is latched. These are compared to the predetermined values to determine the timing situation at the onset of a frame rate mode. Each zone refers to which particular frame would be dropped or repeated in the subsequent sequence of frames. Once the zone is determined, in this embodiment, sometime after entering a particular frame rate mode the display change signal tells the display generator to use the appropriate frame rate.

Figure 11:
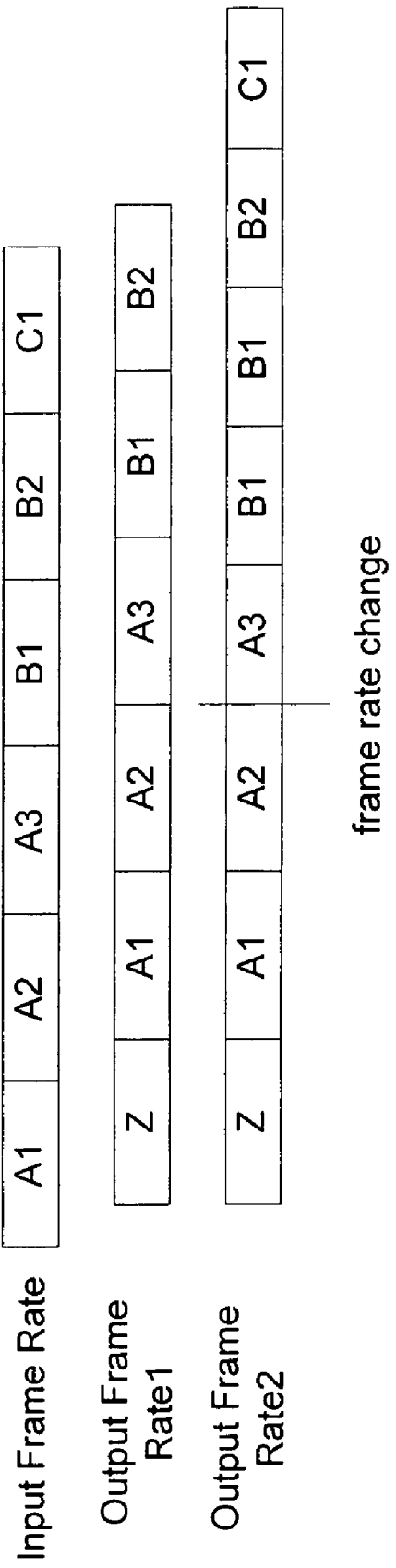
FIG. 11 illustrates a frame rate conversion scenario in which the input is the same as that in FIG. 8, and the frame rate is changed during the B1 input frame.

Consider the streams of FIG. 11. The first two streams are the same as in FIGS. 8 and 9. In the third stream, the frame rate changed during the B1 input frame. In FIG. 11, it is illustrated that the control logic defines when the frame rate changes. In this case, the control logic changed the frame rate during input frame B1. In doing this, a symmetric output pattern is created.

Display Change Logic 208

The display change logic 208, based upon the zone detected, the type of film pattern and where the current frame resides relative to the film sequence pattern, modifies the frame rate conversion operation. It may define which video frames are written into the FRC memory and when the display frame rate changes, it may tell the frame rate converter which frames to read from memory and when the display rate changes or it may just tell the display generator when to change the display frame rate.

Embodiments

The core logic described above can be used by itself or it can be coupled with other components to provide a system. The system may take the digitized raw data, or decoded video or video from an MPEG decoder. The system may take a progressive input or an interlaced input. The system may receive its change frame rate indication signal (in the described embodiment a film indication signal) from an external source, from an internal MPEG decoder or an internal detector. Motion adaptive de-interlacing for interlaced inputs may be performed before the frame rate conversion, or it may be done after the frame rate conversion. Optionally, scan converters could be added to change the number of pixels per line, lines per frame or even the shape of the image. The system output could be digital or analog.

A method and system in accordance with the present invention displays the best image possible depending upon the content by dynamically switching the frame rate. In a preferred embodiment, an asymmetric film pattern, where one image is displayed for $3/60$ seconds and the next image is displayed for $2/60$ seconds, is converted to a symmetric pattern where each image is displayed for the same amount of time, such as $2/48$ seconds or $3/72$ seconds (both amount to $1/24$ seconds, effectively shuttering it at 2× or 3× much in the same way a film is presented in a movie theater). Conversely video material where every image is unique is displayed at its native rate.

Although the present invention has been described in accordance with the embodiments shown, one of ordinary skill in the art will readily recognize that there could be variations to the embodiments and those variations would be within the spirit and scope of the present invention.

For example, the frame rate can be controlled using a constant frequency clock and by changing the value of HTOTAL. The frame rate can be controlled using a constant frequency clock and by changing the value of VTOTAL. The frame rate can be controlled by using a constant HTOTAL and VTOTAL and by changing the clock rate. In addition, the video display system can be an LCD, DLP, PDP or other pixelated display means in which the frame rate can be switched instantaneously without artifacts.

Frame rate conversion may be modified to ensure a symmetric output by modifying what is written into the FRC, what is read from the FRC or when the change in frame rate occurs.

The video display system can also be a CRT or other rastered display means in which the frame rate can be gradually switched over a finite time interval without artifacts. In addition, the frame rate control can be based on whether the source material is film or video originated. Finally, the frame rate converter can convert from an asymmetric pattern to a symmetric one. Accordingly, many modifications may be made by one of ordinary skill in the art without departing from the spirit and scope of the appended claims.

What is claimed is:

1. A method of displaying an output video formed of a plurality of output video frames at an optimal display frame rate on a display device, comprising:
    receiving an input video stream formed of a plurality of input video frames at a native frame rate;
    generating a temporal relationship by comparing corresponding ones of the input video frames and the output video frames; and
    optimizing the display frame rate based upon the temporal relationship wherein when the input video stream is video, then the optimal display frame rate is the native frame rate; wherein the output video has a symmetric output frame pattern; and further comprising if the input video stream has an asymmetric input frame pattern, then converting the asymmetric input frame pattern to the symmetric output frame pattern based upon the temporal relationship between the input video and output video frames.

2. A method as recited in claim 1, further comprising:
    determining an input video frame to output video frame delay; and
    dropping selected ones of the plurality of input video frames or repeating selected ones of the plurality of input video frames based upon the input video frame to output video frame delay.

3. The method as recited in claim 1 wherein the display device is an LCD, DLP, PDP, or other pixelated display means in which the frame rate can be switch.

4. The method as recited in claim 1 wherein the display device is a CRT or other rastered display means in which the frame rate can be changed over a finite time interval without artifacts.

5. A video display system for displaying an output video formed of a plurality of output video frames at an optimal display frame rate on a display device, comprising:
    an input interface for receiving an input video stream formed of a plurality of input video frames at a native frame rate;
    a temporal relationship generator unit for generating a temporal relationship coupled to the input interface by comparing corresponding ones of the input video frames and the output video frames; and
    a frame rate converter unit coupled to the temporal relationship generator for optimizing the display frame rate based upon the temporal relationship wherein when the input video stream is video, then the optimal display frame rate is the native frame rate; wherein the output video has a symmetric output frame pattern; and further comprising if the frame pattern converter unit for converting an asymmetric input frame pattern to the symmetric output frame pattern based upon the temporal relationship between the input video and output video frames.

6. A video display system as recited in claim 5, wherein the frame rate converter drops selected ones of the plurality of input video frames or repeats selected ones of the plurality of input video frames based upon the input video frame to output video frame delay based upon an input video frame to output video frame delay.

7. The video display system as recited in claim 5 wherein the display device is an LCD, DLP, PDP, or other pixelated display means in which the frame rate can be switch.

8. The video display system as recited in claim 5 wherein the display device is a CRT or other rastered display means in which the frame rate can be changed over a finite time interval without artifacts.

9. Computer program product executable by a processor for displaying an output video formed of a plurality of output video frames at an optimal display frame rate on a display device, comprising:
    computer code for receiving an input video stream formed of a plurality of input video frames at a native frame rate;
    computer code for generating a temporal relationship by comparing corresponding ones of the input video frames and the output video frames;
    computer code for optimizing the display frame rate based upon the temporal relationship; and
    computer readable medium for storing the computer code wherein when the in put video stream is video, then the optimal display frame rate is the native frame rate; wherein the output video has a symmetric output frame pattern; and further comprising computer code for converting an asymmetric input frame pattern to the symmetric output frame pattern based upon the temporal relationship between the input video and output video frames if the input video stream has the asymmetric input frame pattern.

10. Computer program product as recited in claim 9, further comprising:

computer code for determining an input video frame to output video frame delay; and computer code for dropping selected ones of the plurality of input video frames or repeating selected ones of the plurality of input video frames based upon the input video frame to output video frame delay.

* * * * *